United States Patent [19]
Takeda

[11] Patent Number: 5,089,775
[45] Date of Patent: Feb. 18, 1992

[54] SENSOR MAGNET MOUNTING DEVICE HAVING AN IMPROVED MOUNTING STRUCTURE

[75] Inventor: Goro Takeda, Kyoto, Japan

[73] Assignee: Cat Eye Co., Ltd., Osaka, Japan

[21] Appl. No.: 613,278

[22] Filed: Nov. 14, 1990

[30] Foreign Application Priority Data

Nov. 15, 1989 [JP] Japan ............... 1-132694[U]

[51] Int. Cl.$^5$ .............................. G01P 3/487
[52] U.S. Cl. ..................... 324/174; 324/166
[58] Field of Search ............ 324/166, 173, 174; 340/671; 364/565; 272/73

[56] References Cited

U.S. PATENT DOCUMENTS 3,898,563 8/1975 Erisman ............... 324/174 X
4,331,918 5/1982 Dunch ................... 324/174

FOREIGN PATENT DOCUMENTS 0004055 1/1981 Japan ................... 324/174

OTHER PUBLICATIONS

Mereness, T. S.; Bicycle Tachometer/Speedometer, IBM Technical Disclosure Bulletin, vol. 17, No. 9, Feb. 1975, pp. 2570, 2571.

Primary Examiner—Gerard R. Strecker
Attorney, Agent, or Firm—Allegretti & Witcoff, Ltd.

[57] ABSTRACT

A sensor magnet mounting device according to the present invention is a device which is attached to a spoke of a rotating wheel and is used for mounting a magnet applying a signal for each revolution of the rotating wheel to a sensor fixed to a frame of a vehicle. This device includes: a magnet housing containing a magnet therein and having a contact surface in contact with the spoke; at least a pair of projecting members constituting a cylindrical portion projecting to hold the spoke with a thread being formed on the inner wall of each of the projecting members; a ring engaging with the projecting members and detachable therefrom; and a set screw engaging with the threads of the projecting members. When the set screw is tightened with the ring being attached, the head of the set screw enables the ring to move toward the magnet housing so that the bottom of the ring presses against the spoke.

10 Claims, 6 Drawing Sheets

SENSOR MAGNET MOUNTING DEVICE HAVING AN IMPROVED MOUNTING STRUCTURE

BACKGROUND OF THE INVENTION

1. Field of the Invention

The present invention relates to sensor magnet mounting devices and particularly to a sensor magnet mounting device for mounting a sensor magnet to be used for detection of a running speed of a two-wheeled vehicle.

2. Description of the Background Art

These days, a speed meter is often mounted on a bicycle to make it easy for the user to have information about the running speed, running distance etc. of the bicycle.

FIG. 8 is an appearance view of a bicycle in which a general display device is incorporated in a speed meter; FIG. 9 is an enlarged view of the portion "X" in FIG. 8; FIG. 10 is a plan view of the receiver shown in FIG. 8; and FIG. 11 is an enlarged perspective view of the mounting portion of the sensor magnet shown in FIG. 9.

Referring to those figures, the structure will be described.

A conventional sensor magnet mounting device includes a signal generating portion and a transmitting portion which are formed by a transmitter 28 detachably mounted on a fork 34 of a front wheel of a bicycle 24, and a sensor magnet 10 detachably mounted on spokes 32 of the front wheel. The sensor magnet 10 is located at a distance from an axle 36 of the front wheel corresponding to the distance (B) between the axle 36 and the transmitter 28.

Thus, each time the sensor magnet 10 passes by the transmitter 28, a contact of a switch (not shown) incorporated in the transmitter 28 is closed by the function of the magnet to generate a signal. The generated signal is transmitted from the transmitter 28 to a receiver 30. The receiver 30 evaluates various data such as the running speed or running distance of the bicycle by counting the transmitted signal. The receiver 30 includes a display portion 16 of liquid crystal, for example, for displaying results of evaluation as required, and a selection switch 38 for arbitrary selection of a display of any of the results of evaluation etc.

The sensor magnet 10 is disposed between two spokes 32 as shown in FIG. 11. A magnet portion 12 is fixed to the two spokes 32 by tightening of set screws 15 in mounting holes 14 of the magnet portion 12 opposite to a mounting plate 13 with the two spokes 32 put therebetween.

In the above-described conventional sensor magnet mounting device, the sensor magnet is mounted on the spokes only by means of the set screws and the mounting is liable to be loosened due to vibrations caused by the running.

The distance between the two spokes where the mounting is made increases according to increase in the distance from the center of the axle of the wheel and in order to accurately detect passage of the sensor magnet by the sensor, it is preferable to mount the sensor magnet in a position distant from the axle. This is because it is easier to detect whether or not the sensor magnet passes by the sensor, as the circumference of rotation of the sensor magnet becomes longer.

The mounting position of the sensor magnet distant from the center of the axle signifies that the mounting position of the transmitter approaches the receiver, which is preferable for operation of transmitting and receiving signals.

However, if the distance B shown in FIG. 9 is increased, the spacing of the spokes becomes large and it is necessary to increase the length of the magnet portion, which involves disadvantages in mounting stability and costs.

SUMMARY OF THE INVENTION

An object of the present invention is to facilitate mounting of a sensor magnet in a sensor magnet mounting device.

Another object of the present invention is to improve mounting stability in a sensor magnet mounting device.

Still another object of the present invention is to reduce the size of a sensor magnet mounting device itself.

A further object of the present invention is to arbitrarily select a mounting distance from a rotating axle in a sensor magnet mounting device.

In order to accomplish the above-described objects, a sensor magnet mounting device according to the present invention is structured as a mounting device attached to a spoke of a rotating wheel of a vehicle, for mounting a magnet on the spoke to apply a signal for each revolution of the rotating wheel to a sensor fixed to a frame of the vehicle. This sensor magnet mounting device includes: a magnet housing containing the magnet therein and having a contact surface to be in contact with the spoke; at least a pair of projecting portions constituting a cylindrical body having a screw thread on its inner wall; a ring engaging with the outer walls of the projecting portions and detachable therefrom; and a set screw engaging with the screw threads of the projecting portions. When the set screw is tightened with the ring being attached to the projecting portions, the head of the set screw moves the ring toward the magnet housing to press the bottom of the ring against the spoke.

Since the sensor magnet mounting device thus structured includes the set screw, the sensor magnet is fixed to one spoke by at least two points and thus the mounting of the sensor magnet can be made easily and reliably.

The foregoing and other objects, features, aspects and advantages of the present invention will become more apparent from the following detailed description of the present invention when taken in conjunction with the accompanying drawings

BRIEF DESCRIPTION OF THE DRAWINGS

There is shown in the attached drawing presently preferred embodiments of the present invention, wherein like numerals refer to like elements in the various views and wherein.

DESCRIPTION OF THE PREFERRED EMBODIMENTS

Figure 1:
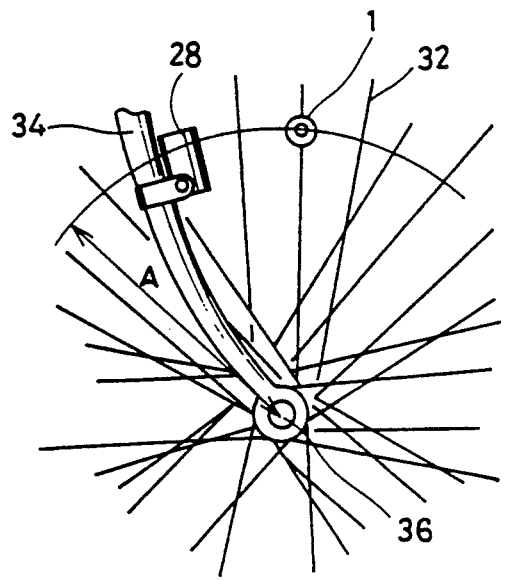
FIG. 1 is a view showing mounting of a transmitter of a rotating wheel according to a first embodiment of the invention.
Figure 9:
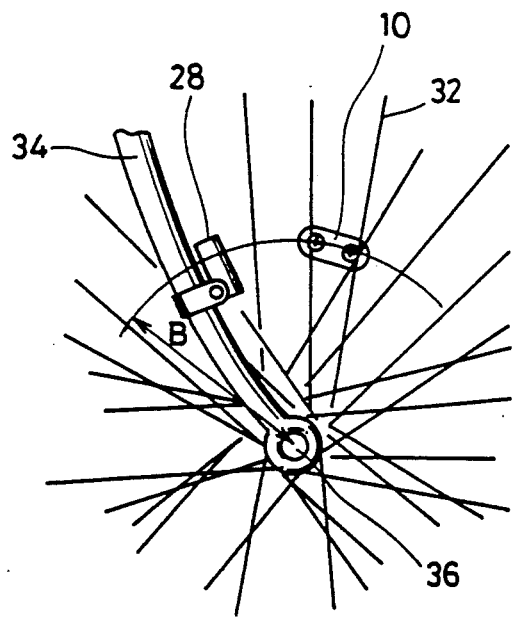
FIG. 9 is an enlarged view of the portion "X" in FIG. 8.
Figure 10:
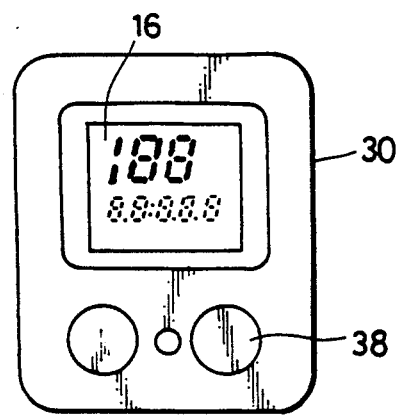
FIG. 10 is a plan view of the receiver shown in FIG. 8.
Figure 11:
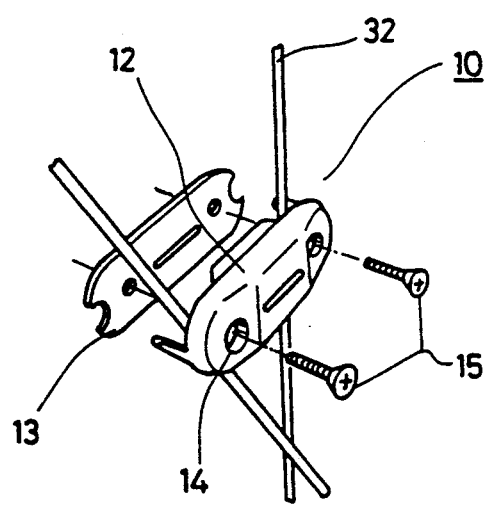
FIG. 11 is an exploded perspective view showing mounting of the sensor magnet in FIG. 9.

FIG. 1 is a view showing mounting of a sensor magnet according to the first embodiment of the invention. This figure corresponds to FIG. 9 showing the conventional device.

Referring to FIG. 1, a sensor magnet 1 is attached to one spoke 32. Consequently, a mounting distance (the dimension A) from an axle 36 can be set arbitrarily as is different from the prior art. A transmitter 28 is mounted on a fork 34 at a position corresponding to the position of mounting of the sensor magnet 1.

Figure 2:
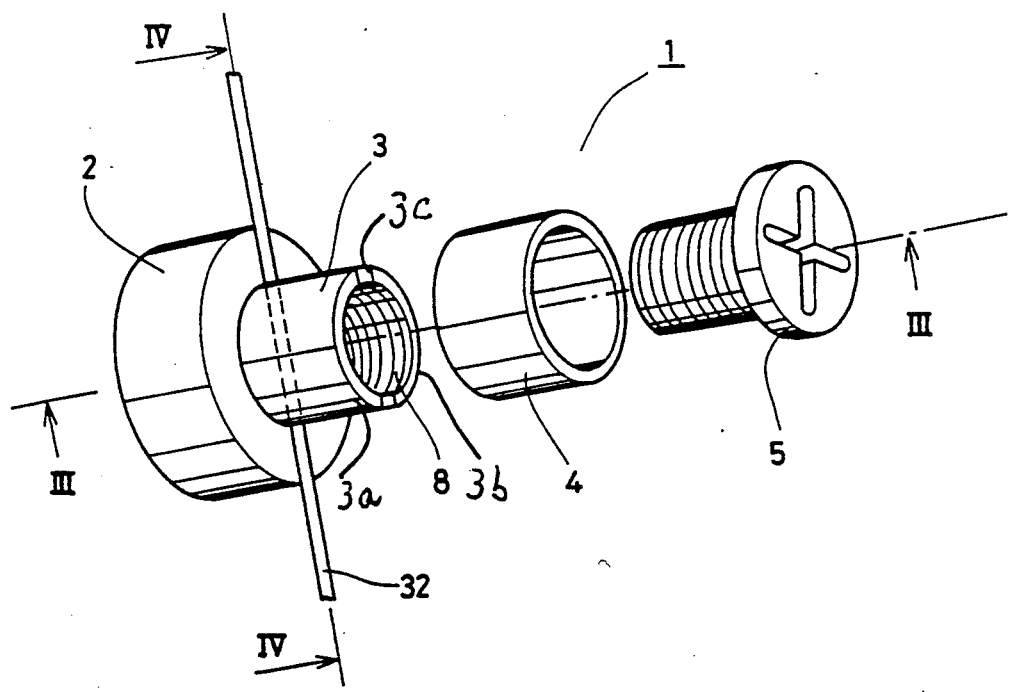
FIG. 2 is an exploded perspective view showing a specific mounting condition of the sensor magnet shown in FIG. 1.

FIG. 2 is an exploded perspective view specifically showing the mounting condition of the sensor magnet shown in FIG. 1.

Referring to FIG. 2, the magnet is contained in one surface of a magnet housing 2, and a projecting portion 3 is provided on the opposite surface of the housing 2. The projecting portion 3 includes two generally semi-cylindrical members 3a and 3b and a screw thread is provided on an inner wall of each member. The semi-cylindrical members 3a and 3b of the projecting portion 3 are separated with a spacing on slot 3c where the spoke 32 is set, and those members are fixed on the magnet housing 2. Alternatively, the projecting portion 3 may be formed integrally with the magnet housing 2. A ring 4 has its inner wall engaged with the outer wall of the projecting portion 3 and it is detachable from the projecting portion 3. A set screw 5 formed by a tapered screw is prepared to engage with the thread portion 8 formed on the inner wall of the projecting portion 3.

Next, mounting operation by the sensor magnet mounting device thus structured will be described.

First, the projecting portion 3 is put on an arbitrary one of the spokes of the wheel so that the spoke is held between the members of the projecting portion 3. Then, the ring 4 is engaged with the outer wall of the projecting portion 3 and in that state the set screw 5 is inserted into the projecting portion 3. In consequence, the ring 4 moves in a direction pressing the spoke 32, whereby the magnet housing 2 is fixed firmly on the single spoke 32.

Figure 3:
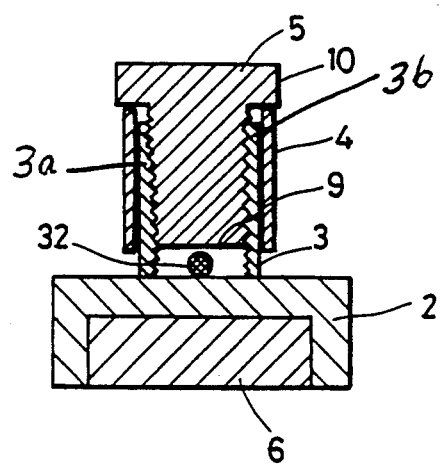
FIG. 3 is a sectional view taken along III—III in FIG. 2, showing the parts in assembled relationship.
Figure 4:
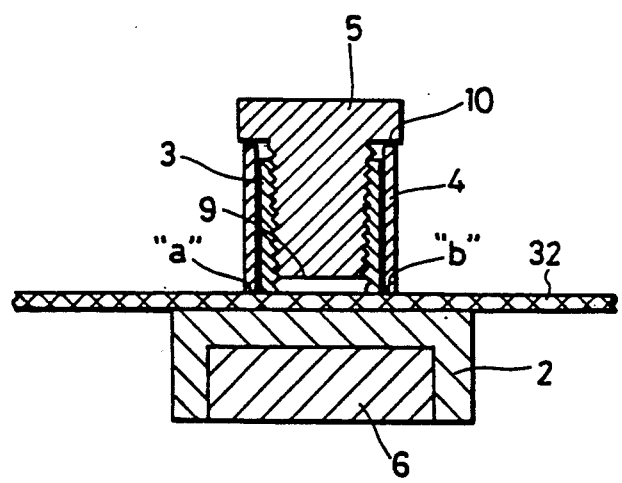
FIG. 4 is a sectional view taken along IV—IV in FIG. 2.

FIG. 3 is a sectional view taken along III—III in FIG. 2, and FIG. 4 is a sectional view taken along IV—IV in FIG. 2. Each of those figures shows actual mounting of the sensor magnet on the spoke.

FIG. 3 shows a state in which the set screw 5 is tightened and the lower surface of the head 10 of the screw presses the ring 4 engaged with the outer surface of the projecting portion 3 to move the ring 4 toward the magnet housing 2. The sensor magnet 6 is mounted in magnet housing 2.

FIG. 4 shows a state in which the ring 4 is moved toward the magnet housing 2 by the head 10 of the set screw 5 which is tightened and the spoke 32 is pressed between the rear surface of the magnet housing 2 and the end surface of the ring 4. Thus, when the magnet sensor is mounted, the spoke 32 is pressed at two points ("a" and "b") of the ring 4 and stable mounting is ensured.

In the above-described embodiment, there is a gap between the bottom 9 of the set screw 5 and the spoke 32 in the state where the ring 4 presses the spoke 32. However, a structure may be adopted in which no gap exists therebetween and the bottom 9 of the set screw 5 as well as the ring 4 presses the spoke 32.

In the above-described embodiment, a parallel thread is formed on the inner wall of the projecting portion 3 and a tapered thread is formed on the thread portion of the set screw 5. Accordingly, when the set screw 5 is tightened, the upper portion of the projecting portion 3 is slightly expanded to contact the ring 4, causing mutual stresses. The reacting force of the ring 4 is transmitted as a force pressing the screw portion of the set screw 5 through the projecting portion 3 and the engagement between the set screw 5 and the projecting portion 3 becomes more firm. Thus, the engagement is hardly loosened due to vibrations or the like caused by running of the bicycle.

Thus, a tapered thread is preferred as the thread portion of the set screw 5 but if a parallel screw is adopted, the pressing force on the spoke 32 by means of the ring 4 is unchanged and accordingly a prescribed effect can be achieved.

Figure 5:
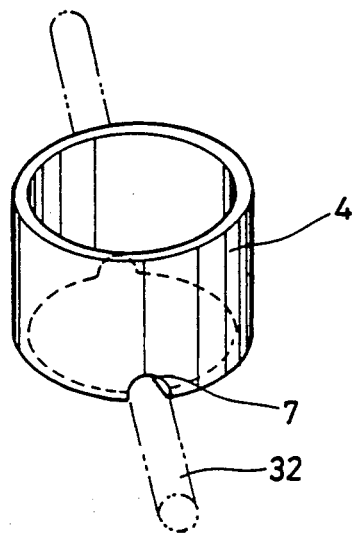
FIG. 5 is a perspective view showing a form of a ring according to a second embodiment of the invention.
Figure 6:
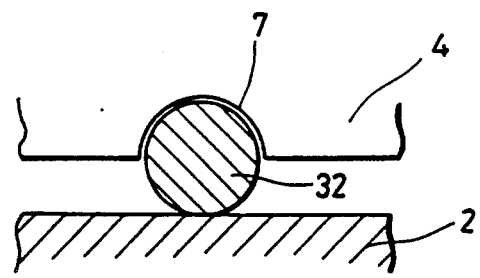
FIG. 6 is an enlarged view of a cut in the ring in FIG. 5.

FIG. 5 shows a variant of the form of the ring according to the second embodiment of the invention, and FIG. 6 is an enlarged view of a cut in the ring shown in FIG. 5.

Referring to those figures, two semi-circular cuts 7 engageable with the spoke 32 are provided in lower end portions of the ring 4. When the ring 4 having such form is used for mounting of the sensor magnet shown in FIG. 2, the ring 4 presses the spoke 32 not at two points as in the above-mentioned embodiment, but in a manner in which two peripheral portions along the cuts 7 are in line contact with the spoke 32. Consequently, stability of mounting of the spoke 32 is further improved compared with the above-mentioned embodiment.

Figure 7:
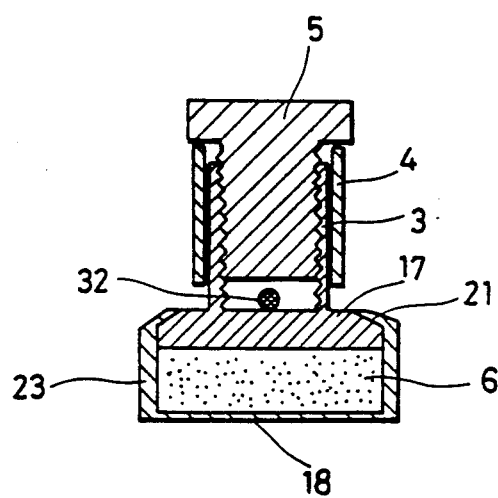
FIG. 7 is a sectional view of a sensor magnet according to a third embodiment of the invention.
Figure 8:
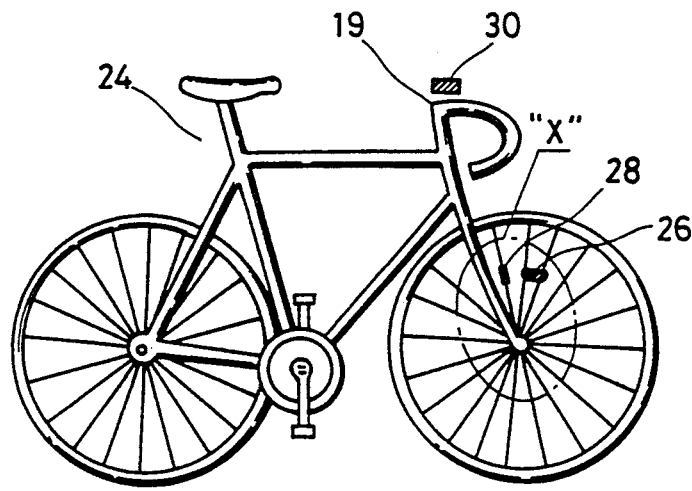
FIG. 8 is an appearance view of a bicycle in which a general display device is incorporated in a speed meter.

FIG. 7 is a sectional view of a sensor magnet according to the third embodiment of the invention, corresponding to FIG. 3 related with the first embodiment.

The structure of the third embodiment will be described. Since the structures and operations of the projecting portion 3, ring 4 and set screw 5 are the same as in the first embodiment, the description thereof is not repeated, and differences from the first embodiment will be mainly described hereinafter.

Referring to FIG. 7, the magnet 6 is not exposed to the transmitter and is covered with a cover 23 of resin. A base member 17 integrally formed with the projecting portion 3 is disposed on the rear surface of the magnet 6. The cover 23 is sufficiently thin to enable a portion 18 facing the transmitter to transmit magnetic field generated by the magnet 6. When the magnet 6 is to be incorporated, the cover 23 is attached to the base member 7 with the magnet 6 being put therebetween and an end portion 21 of the cover 23 is plastically deformed by heat treatment so that the end portion 21 is curled toward the base member 17. Consequently, the magnet 6 is enclosed between the base member 17 and the cover 23, whereby the magnet 6 can be prevented from being thrown out due to rotation of the wheel. Thus, the cover 23 will prevent the magnet 6 from coming out of the housing comprised of the base member 17 and the cover 23 if the magnet 6 should crack.

In the above described first embodiment, the projecting portion has a pair of members. However, the projecting portion may be further divided into small members so that the spoke can be held in any of gaps between the respective members.

As described in the foregoing, according to the present invention, the sensor magnet can be mounted on one spoke by contact at least at two points and it is possible to mount the sensor magnet stably at an arbitrary distance from the center of the rotating axle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mounting device attached to a spoke 1 of a rotating wheel on the frame of a vehicle, for mounting a magnet 6 applying a signal for each revolution of said rotating wheel to a sensor 28 fixed to the frame of said vehicle, comprising:
    a magnet housing 2 containing a magnet and having a contact surface for contact with said spoke,
    at least a pair of projecting members 3 each constituting a cylindrical portion projecting from said magnet housing, said projecting members being spaced to define a gap to receive said spoke, a thread portion 8 being formed on an inner wall of each of said projecting members,
    a ring 4 engaging with the outer walls of said projecting members and detachable therefrom and
    a set screw 5 engaging with the thread portions of said projecting members, said set screw having a head,
    the head of said set screw moving said ring toward said magnet housing to press said spoke by means of a bottom of said ring when said set screw is tightened, with said ring engaging with the outer walls of the projecting members.

2. The device in accordance with claim 1, wherein two semi-circular cuts are provided on the bottom of said ring to be in line contact with said spoke.

3. The device in accordance with claim 2, wherein a radius of each said cut is equal to a radius of said spoke.

4. The device in accordance with claim 1, wherein said set screw is a tapered screw.

5. The device in accordance with claim 1, wherein said magnet housing includes a base member 17 to be in contact with said spoke, and a cover 18 covering said magnet attached to a surface opposite to a surface of said base member in contact with said spoke, and an end 21 of said cover is plastically deformed by heat treatment and is curled toward said surface of said base member in contact with said spoke.

6. The device in accordance with claim 5, wherein said projecting members are formed integrally with said magnet housing.

7. The device in accordance with claim 1, wherein said projecting members are an even number of pairs of members and said spoke is set in the gap between said projecting members.

8. A mounting device adapted to be attached to a spoke of a rotating wheel for mounting a magnet comprising:
    a magnet housing containing a magnet and having a contact surface adapted to be in contact with said spoke,
    a generally cylindrical projecting member projecting from said magnet housing, said projecting member having an inner wall and an outer wall, a thread portion being formed on the inner wall of said projecting member, a ring engaging with the outer wall of said projecting member and detachable therefrom, a fastener engaging with the thread portion of said projecting member, said fastener having a head for engaging said ring and moving said ring toward said magnet housing for clamping a spoke between the ring and the magnet housing when the fastener is engaged with the thread portion.

9. A mounting device in accordance with claim 8 wherein the projecting member comprises two generally semi-cylindrical portions separated by a slot adapted to receive a spoke.

10. A mounting device as in claim 9 wherein the fastener is a set screw having an external thread portion that engages the thread portion of the projecting member.

* * * * *